Patented Nov. 29, 1932

1,889,327

UNITED STATES PATENT OFFICE

JOHANN A. BERTSCH, OF ST. LOUIS, MISSOURI, ASSIGNOR TO THE RUBBER SERVICE LABORATORIES COMPANY, OF AKRON, OHIO, A CORPORATION OF OHIO

TREATMENT OF RUBBER

No Drawing.    Application filed October 10, 1930.    Serial No. 487,917.

The present invention relates to a process for the manufacture of vulcanized rubber and the products obtained thereby. More particularly, the invention is directed to an improved process of manufacturing vulcanized rubber and the like wherein there is incorporated into a rubber mix of vulcanization characteristics, a compound of the type hereinafter disclosed whereby anti-oxidant or age resisting properties are developed in the vulcanized rubber product. The invention will be understood from the following description and examples wherein a preferred mode of operating the invention is fully set forth and described.

It is well known that rubber deteriorates rapidly when exposed to air, heat and sunlight and that such deterioration is characterized by a loss in the tensile strength, resiliency and other desirable properties of the material. It has now been found, according to the present invention, that such deterioration can be very greatly lessened if there be incorporated in the rubber mix a compound of the class hereinafter set forth.

The age resisting characteristics of a vulcanizer rubber product can be readily ascertained by subjecting samples of the vulcanized product to an accelerated aging test wherein portions of the cured rubber product are subjected in a bomb to the action of oxygen under pressure and maintained for several hours at an elevated temperature. The treated samples are then examined and tested and the results compared with similar results obtained by testing the unaged vulcanized stock. The deterioration in properties suffered as a result of the oxidation treatment is indicative of the result that would normally be expected from that particular stock during several years of natural aging. Such a test is known as the Bierer-Davis aging test.

The new class of anti-oxidant or age resisting materials described herein and which have been found upon incorporation into a rubber stock to impart such excellent age resisting qualities to the vulcanized product that portions thereof, when subjected to the artificial aging tests described, undergo only a relatively small loss in tensile strength and other qualities, comprise a cyclohexyl substituted amine. More particularly, the present invention relates to the use of a new class of anti-oxidants comprising a reaction product of a cyclohexyl halide with a primary aromatic amine.

One method whereby one of the preferred class of anti-oxidants, for example cyclohexyl aniline, may be prepared is as follows.

Cyclohexyl chloride and aniline in the ratio of substantially one molecular proportion of the former compound to substantially two molecular proportions of the latter compound were placed in a suitable vessel equipped with a reflux condenser and heated, is convenient or desirable in the presence of a small proportion of a catalyst or condensing agent such as copper powder or zinc chloride and the like at a temperature of approximately 140 to 160° C. until reaction was completed. On completion of the reaction, the reaction product so obtained was extracted with water to remove the aniline hydrochloride formed and the desired compound isolated by any convenient means as for example by fractional distillation. It is thought that the reaction representing the preparation of the above compound proceeds as follows:

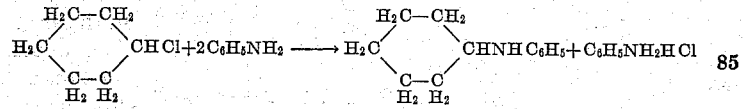

The product prepared in the manner described, comprising a liquid boiling at substantially 140 to 150° C. at 15 mm. pressure was compounded in the well known manner in a typical rubber tread stock comprising

|  | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenylguanidine | 1 |
| The anti-oxidant described above | 1 |

The stock was then vulcanized by heating portions of said stock in a press in the well known manner for different periods of time at the temperature given by forty pounds of steam pressure to the square inch. Portions of the stock cured as set forth were then artificially aged by heating in an oxygen bomb in the manner described for 36 hours at a temperature of 70° C. and an oxygen pressure of 300 pounds per square inch. A comparison between the tensile and modulus properties of the aged and unaged vulcanized rubber product is given in Table I.

Table I

| Cure minutes | Hours aged | Modulus of elasticity in lbs/in² at elongations of | | Tensile at break in lbs/in² | Ultimate elongation per cent |
| --- | --- | --- | --- | --- | --- |
| | | 300% | 500% | | |
| 30 | 0 | 735 | 2083 | 2810 | 590 |
| 30 | 36 | 702 | 1560 | 1560 | 500 |
| 60 | 0 | 1128 | 2710 | 3480 | 595 |
| 60 | 36 | 974 | ---------- | 1895 | 470 |
| 90 | 0 | 1325 | 3195 | 3665 | 575 |
| 90 | 36 | 1150 | ---------- | 1840 | 440 |

The data set forth in Table I show that the preferred class of anti-oxidant materials, for example cyclohexyl aniline, possesses desirable anti-oxidant properties in that a substantial portion of the characteristic properties of the rubber are retained even after the stock is subjected to so vigorous a test.

Another example of the preferred class of anti-oxidants, for example cyclohexyl alpha-naphthylamine, was prepared by reacting subtsantially one molecular proportion of cyclohexyl chloride with substantially two molecular proportions of alpha-naphthylamine in a manner analogous to that described above. It is thought that the reaction representing the preparation of the compound described proceeds according to the following equation:

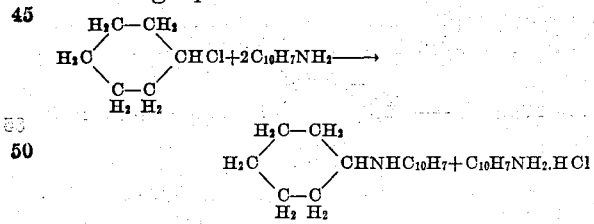

The product thus prepared, comprising a liquid boiling at substantially 245 to 255° C. at 20 mm. pressure, was incorporated in a rubber mix in the usual manner comprising

| | Parts |
| --- | --- |
| Smoked sheet rubber | 100 |
| Carbon black | 40 |
| Zinc oxide | 10 |
| A blended mineral oil and rosin | 2 |
| Sulfur | 3.25 |
| Diphenylguanidine | 1 |
| The anti-oxidant described above | 1 |

The stock was then vulcanized by heating in a press for different periods of time at the temperature of 40 pounds of steam pressure per square inch. Portions of the cured rubber product were then artificially aged by heating in a bomb in the manner described for 39 hours at 70° C., and under an oxygen pressure of 300 pounds per square inch. A comparison between the tensile and modulus properties of the aged and unaged vulcanized rubber product is given in Table II.

Table II

| Cure minutes | Hours aged | Modulus of elasticity in lbs/in² at elongations of | | Tensile at break in lbs/in² | Ultimate elongation per cent |
| --- | --- | --- | --- | --- | --- |
| | | 300% | 500% | | |
| 30 | 0 | 763 | 1930 | 2820 | 630 |
| 30 | 39 | 739 | ---------- | 1240 | 420 |
| 60 | 0 | 1223 | 2775 | 3380 | 625 |
| 60 | 39 | 1065 | ---------- | 1848 | 480 |
| 90 | 0 | 1338 | 3070 | 3865 | 595 |
| 90 | 39 | 1195 | ---------- | 1905 | 460 |

From the data set forth in Table II it is apparent that cyclohexyl alpha-naphthylamine possesses the desirable anti-oxidant properties of the preferred class of compounds.

As further examples of operating the present invention dicyclohexyl p,p'-diamino-diphenylmethane, cyclohexyl orthotoluidine and dicyclohexyl benzidine have been prepared and incorporated in rubber stocks of similar composition to those described above, and the said stocks cured and aged in the manner set forth. The results of the aging tests showed that these compounds also possess anti-oxidant properties.

From the data hereinbefore set forth it is apparent that the preferred class of compounds comprises an important class of anti-oxidants which have been employed advantageously in a rubber stock.

Other reaction products of the preferred class of compounds may be prepared in a manner analogous to the methods hereinbefore described and employed in the manner set forth in a rubber stock of vulcanization characteristics. Thus, cyclohexyl chloride may be reacted with beta naphthylamine, p-phenylene diamine, meta phenylene diamine, 2,4 diamino diphenyl amine, xylidene, tolidine and similar compounds and employed as anti-oxidants in the manner described. Furthermore cyclohexyl bromide may be substituted for cyclohexyl chloride in the preparation of the preferred class of compounds.

In the above described examples of the use of the preferred class of anti-oxidants, diphenylguanidine was employed as the accelerator, because it is known that a stock in which it has been used shows poor aging qualities; other accelerators could have been employed and the class of anti-oxidants disclosed herein would still exhibit the age resisting qualities set forth.

The present invention is limited solely by the claims attached hereto as a part of the present specification wherein it is intended to claim the invention as broadly as possible in view of the prior art.

What is claimed is:

1. The process of treating rubber which comprises heating a rubber-sulfur mix in the presence of a cyclohexyl substituted aryl amine wherein the cyclohexyl group is attached to the nitrogen atom of said amine.

2. The process of treating rubber which comprises heating a rubber-sulfur mix in the presence of a cyclohexyl substituted mono aryl amine wherein the cyclohexyl group is attached to the nitrogen atom of said amine.

3. The process of treating rubber which comprises heating a rubber-sulfur mix in the presence of cyclohexyl aniline.

4. The rubber product prepared by heating a rubber-sulfur mix in the presence of a cyclohexyl substituted aryl amine wherein the cyclohexyl group is attached to the nitrogen atom of said amine.

5. The rubber product prepared by heating a rubber-sulfur mix in the presence of a cyclohexyl substituted mono aryl amine wherein the cyclohexyl group is attached to the nitrogen atom of said amine.

6. The rubber product prepared by heating a rubber-sulfur mix in the presence of cyclohexyl aniline.

7. The process of treating rubber which comprises heating a rubber-sulfur mix in the presence of a cyclohexyl derivative of a primary aromatic amine wherein the cyclohexyl group is attached to the nitrogen atom of said amine.

8. The process of treating rubber which comprises heating a rubber-sulfur mix in the presence of a reaction product of a cyclohexyl halide with a primary amine.

9. The process of treating rubber which comprises heating a rubber-sulfur mix in the presence of a reaction product of cyclohexyl chloride with an aromatic primary amine.

10. The rubber product prepared by heating a rubber-sulfur mix in the presence of a cyclohexyl derivative of a primary aromatic amine wherein the cyclohexyl group is attached to the nitrogen atom of said amine.

11. The rubber product prepared by heating a rubber-sulfur mix in the presence of a reaction product of a cyclohexyl halide with a primary amine.

12. The rubber product prepared by heating a rubber-sulfur mix in the presence of a reaction product of cyclohexyl chloride with an aromatic primary amine.

13. The process of treating rubber which comprises heating a rubber-sulfur mix in the presence of a reaction product of a cyclohexyl halide and an aromatic primary amine.

14. The rubber product prepared by heating a rubber-sulfur mix in the presence of a reaction product of a cyclohexyl halide and an aromatic primary amine.

In testimony whereof I affix my signature.

JOHANN A. BERTSCH.